(12) United States Patent
Nagatsuyu

(10) Patent No.: US 6,848,709 B2
(45) Date of Patent: Feb. 1, 2005

(54) AIRBAG APPARATUS FOR MOTORCYCLES

(75) Inventor: Toshiya Nagatsuyu, Saitama (JP)

(73) Assignee: Da Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/369,751

(22) Filed: Feb. 21, 2003

(65) Prior Publication Data

US 2003/0222438 A1 Dec. 4, 2003

(30) Foreign Application Priority Data

Mar. 6, 2002 (JP) ........................................ 2002-060865

(51) Int. Cl.[7] ............................................. B60R 21/22
(52) U.S. Cl. ................................................. 280/730.1
(58) Field of Search ........................ 280/730.1, 730.2, 280/728.2, 733

(56) References Cited

U.S. PATENT DOCUMENTS

| | | | |
|---|---|---|---|
| 3,930,667 A | * | 1/1976 | Osuchowski et al. ..... 280/730.1 |
| 5,967,545 A | * | 10/1999 | Iijima et al. ............. 280/730.1 |
| 6,007,090 A | * | 12/1999 | Hosono et al. ........... 280/730.2 |
| 6,113,133 A | * | 9/2000 | Iijima et al. ............. 280/730.1 |

FOREIGN PATENT DOCUMENTS

| | | | | |
|---|---|---|---|---|
| JP | 09-328053 A | | 12/1997 | |
| JP | 11278342 A | * | 10/1999 | ............ B62J/27/00 |
| JP | 2003327183 A | * | 11/2003 | ............ B62J/27/00 |

* cited by examiner

Primary Examiner—Faye M. Fleming
(74) Attorney, Agent, or Firm—Birch, Stewart, Kolasch & Birch, LLP

(57) ABSTRACT

An airbag apparatus for a motorcycle includes an airbag module with an airbag that is capable of being inflated and deployed so as to restrain the rider on a seat disposed behind the fuel tank from the front that is mounted on the vehicle body frame. Without requiring a modification of the configuration of the appearance constituting parts of the motorcycle, water, mud, or the like is prevented from breaking into the airbag module. The front portion of the seat that covers the airbag module to be mounted on the vehicle body frame at a position rearwardly of the fuel tank from above and extends to the position on the rear portion of the fuel tank is constructed so as to be opened with the rear side raised upwardly in response to inflation and deployment of the airbag.

20 Claims, 4 Drawing Sheets

AIRBAG APPARATUS FOR MOTORCYCLES

CROSS-REFERENCE TO RELATED APPLICATIONS

The present nonprovisional application claims priority under 35 USC 119 to Japanese Patent Application No. 2002-060865 filed on Mar. 6, 2002 the entire contents thereof is hereby incorporated by reference.

BACKGROUND OF THE INVENTION

1. Field of the Invention

The present invention relates to an airbag apparatus to be mounted on a vehicle body frame for a motorcycles that includes an airbag module having an airbag that is capable of being inflated and deployed for restraining a rider sitting on the seat disposed behind the fuel tank from the front.

2. Description of the Related Art

Airbag apparatus for motorcycles are known in the related art, for example, as set forth in JP-A-9-328053.

However, in the related art described above, an airbag module is disposed so as to be exposed between a fuel tank and a seat that is disposed behind the fuel tank at a distance. Therefore, it is possible that water, mud or the like may break into the airbag module. In order to prevent such a break-in, the configuration of the appearance forming part of the a vehicle body cover or the like has to be modified.

SUMMARY AND OBJECTS OF THE INVENTION

In view of such circumstances, an object of the present invention is to provide an airbag apparatus for motorcycles in which break-in of water, mud or the like into the airbag module may be prevented without modifying the configuration of the appearance forming parts.

In order to achieve the object described above, the present invention provides an airbag apparatus that is adapted to be mounted on the vehicle body frame for a motorcycle that includes an airbag module having an airbag that is capable of being inflated and deployed for restraining a rider sitting on the seat disposed behind the fuel tank from the front. The front portion of the seat which covers the airbag module to be mounted behind the fuel tank on the vehicle body frame extends to a position on the rear portion of the fuel tank and is constructed to be capable of being opened with the rear side raised upwardlyly in response to inflation and deployment of the aforementioned airbag.

In such a structure, the airbag module is covered from above by the font portion of the seat in a state in which no impact is exerted on the motorcycle, which may prevent water, mud, or the like from breaking into the airbag module without modifying the configuration of the appearance constituting such parts as the vehicle body cover and the like. Since the front portion of the seat is capable of being opened with the rear side raised upwardly, when an impact is exerted on the motorcycle, the airbag is capable of being inflated and deployed while pushing the front portion of the seat upwardly. Thus, the rider on the seat may be restrained from the front to alleviate the impact.

The present invention provides a seat bottom plate constituting the bottom of the seat that includes a main bottom plate portion that rotatably supports a major part of the seat and a front bottom plate portion for supporting a front portion of the seat. The front bottom plate portion is connected to the front portion of the main bottom plate portion with a hinge in such a manner that the front bottom plate portion rotates so as to move the rear portion upwardly in response to inflation and deployment of the airbag. In this arrangement, the front portion of the seat may be opened with the rear side raised upwardly in a dimple structure.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An embodiment of the invention will now be described based on an example of the present invention shown in the attached drawings.

Figure 1:
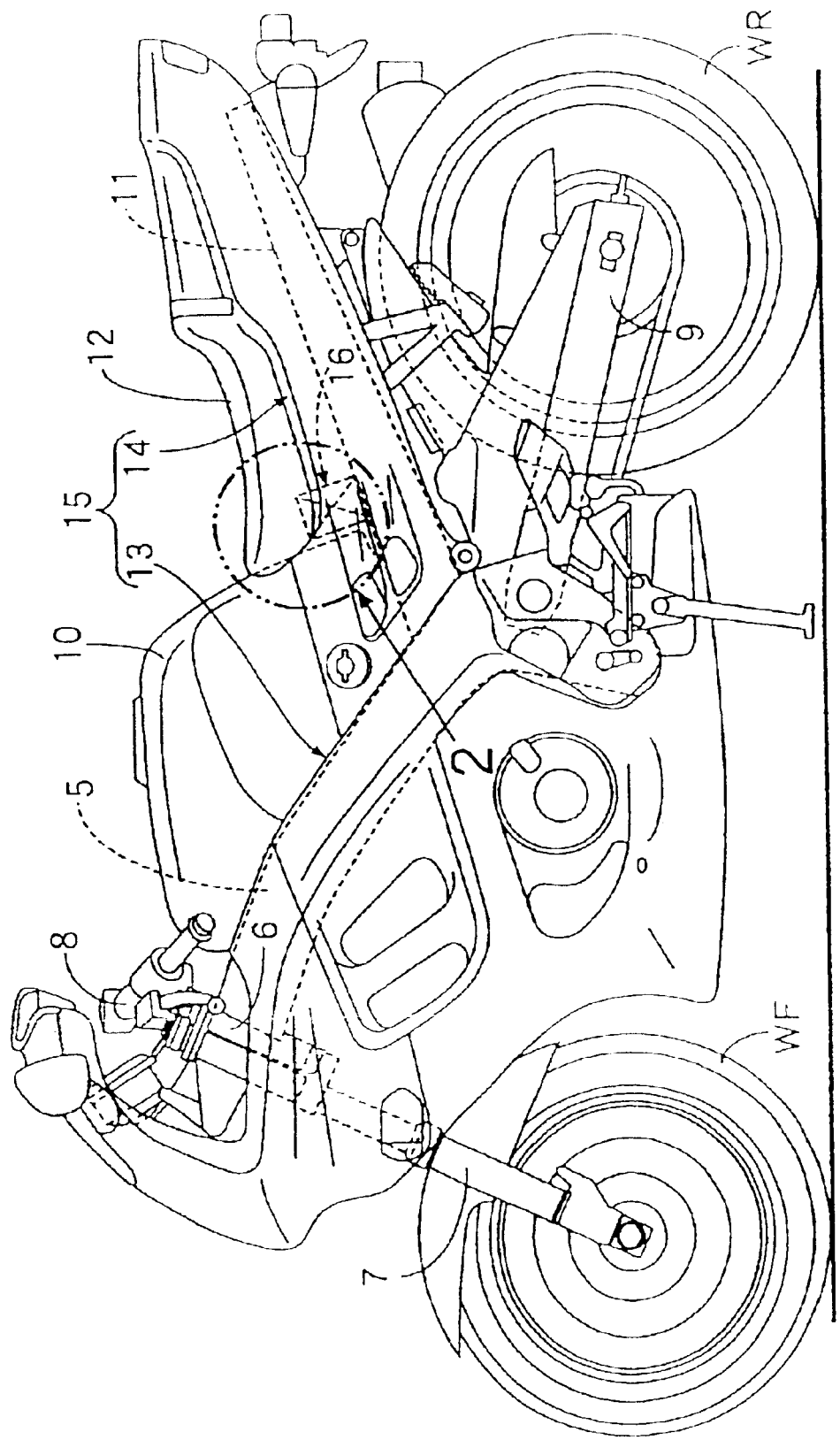
FIG. 1 is a side view of a motorcycle.

In FIG. 1, a front fork 7 is steerably supported by a head pipe 6 provided at the front end of a vehicle body frame 5 of the motorcycle with a front wheel WF that is rotatably supported at the lower end of the front fork 7 and a steering handle 8 is connected to the upper portion of the front fork 7. A swing arm 9 is journaled at the rear portion of the vehicle body frame 5 so as to be capable of a vertical swinging motion. A rear wheel WR is journaled at the rear end of the swing arm 9.

A fuel tank 10 is mounted on the front half of the vehicle body frame 5. A tandem seat 12, which may be have a rising and falling surface, is arranged rearwardly of the fuel tank 10 and is disposed on a seat rail 11 provided on the rear portion of the vehicle body frame 5.

Most parts of the vehicle body frame 5 are covered by a vehicle body cover 15 formed of a synthetic resin that includes a front cowl 13 and a rear cowl 14.

Figure 2:
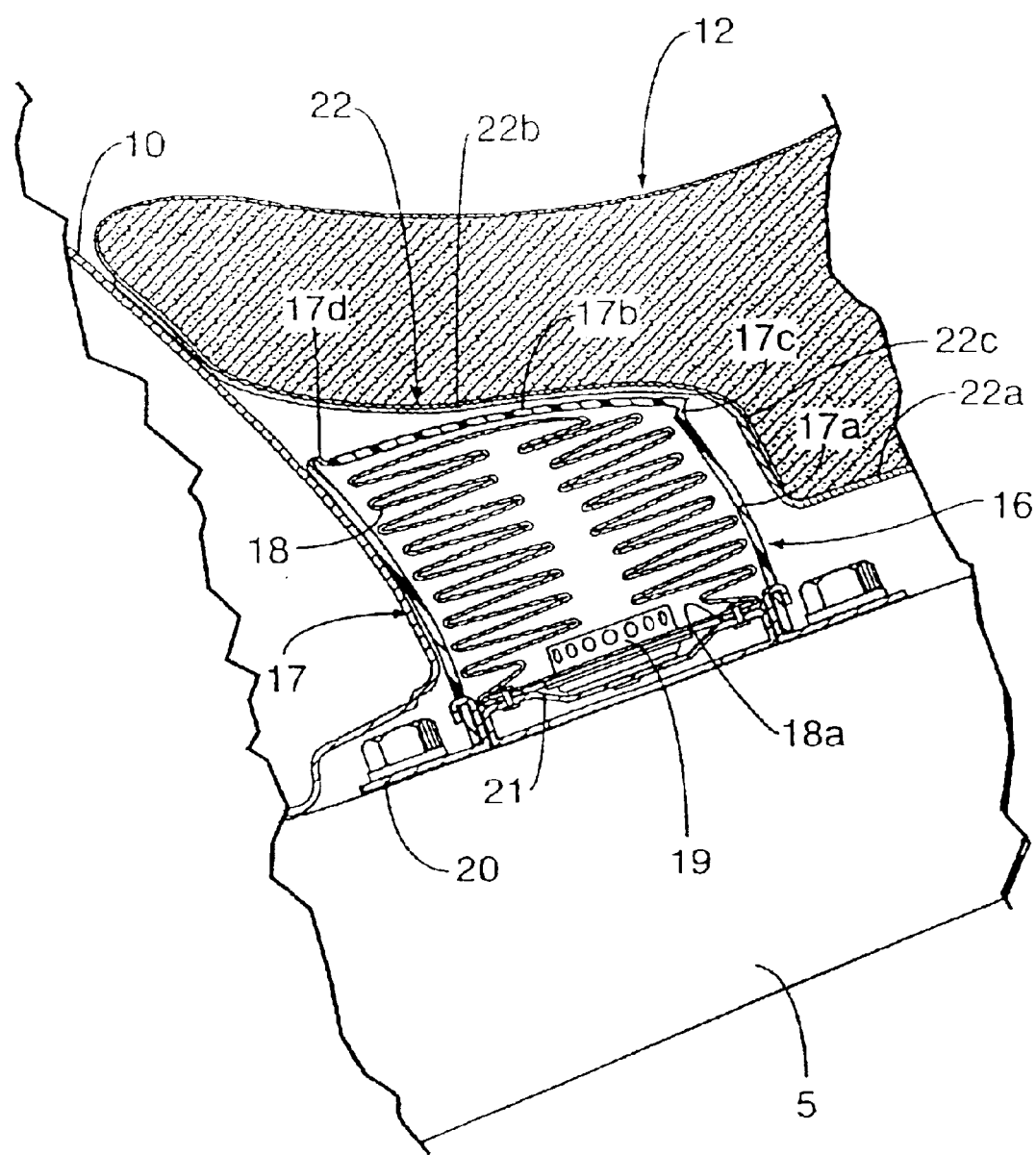
FIG. 2 is an enlarged vertical cross-sectional view showing the portion indicated by an arrow 2 in FIG. 1.

Referring to FIG. 2, an airbag module 16 of the airbag apparatus is mounted on the vehicle body frame 5 at a position rearwardly of the fuel tank 10. The airbag module 16 includes an airbag housing 17 with an airbag 18 to be stored in the airbag housing 17 together with an inflator 19 for generating gas for inflating and deploying the airbag 18.

The airbag housing 17 includes a cylindrical storage portion 17a in which the airbag 18 may be stored in the folded state. A lid portion 17b is provided for closing the upper opening of the cylindrical storage portion 17a, and is formed of light material such as a synthetic material or the like into a cap shape. The lower opening of the airbag housing 17 is attached to the vehicle body frame 5 with a mounting strip 20 to be fastened to the vehicle body frame 5. The lid portion 17b is connected to the cylindrical storage portion 17a via a hinge 17c to be disposed at a position on the periphery of the lid portion 17b, for example, a position opposite from the fuel tank 10 and a weakened portion 17d of the periphery of the lid portion 17b other than the aforementioned hinge 17c. The weakened portion 17d is formed so as to be easily broken.

The airbag 18 is formed with an opening 18a on the lower surface thereof and is stored in the airbag housing 17 in the folded state. The inflator 19 is supported by a mouth ring 21 to be secured to the opening 18a on the lower surface of the aforementioned airbag 18, and is fixedly supported by the aforementioned mounting strip 20.

The vehicle body frame 5 is provided with an impact detection sensor (not shown) such as an acceleration sensor and the like, and the aforementioned inflator 19 is actuated in response to the impact detection sensor upon detection of an impact larger than a predetermined value for supplying high pressure gas into the airbag 18.

The front portion of the seat 12 is formed so as to cover the aforementioned airbag module 16 from above and extends to a position on the rear portion of the aforementioned fuel tank 10 and is constructed to be capable of being opened with the rear side raised upwardly in response to inflation and deployment of the airbag 18 in the airbag module 16.

In other words, the seat bottom plate 22 for constructing the bottom portion of the seat 12 includes a main bottom plate portion 22a that rotatably supports a major part of the seat 12 and a front bottom plate portion 22b for supporting a front portion of the seat 12. The front bottom plate portion 22b is connected to the front portion of the main bottom plate portion 22a with a hinge 22c. The hinge 22c enables the front bottom plate portion 22b to open with the rear side raised upwardly with respect to the main bottom plate portion 22a. With the simple structure of the seat bottom plate 22, the front portion of the seat 12 may be opened with the rear side raised upwardly upon inflation and deployment of the airbag 18.

The operation of this embodiment will now be described. The airbag module 16 is mounted on the vehicle body frame 5 at a position behind the fuel tank 10. The front portion of the seat 12 covers the airbag module 16 from above and extends to a position on the rear portion of the fuel tank 10 and is constructed so as to open with the rear side raised upwardly in response to inflation and deployment of the air bag 18 of the airbag module 16.

Therefore, in the normal state in which the impact detection sensor does not detect an impact larger than a predetermined value, the airbag module 16 is covered by the front portion of the seat 12 from above as shown in FIG. 2, and thus water, mud, and the like may be prevented from breaking into the airbag module 16 without modifying the configuration of the appearance constituting parts such as the vehicle body cover 15.

Figure 3:
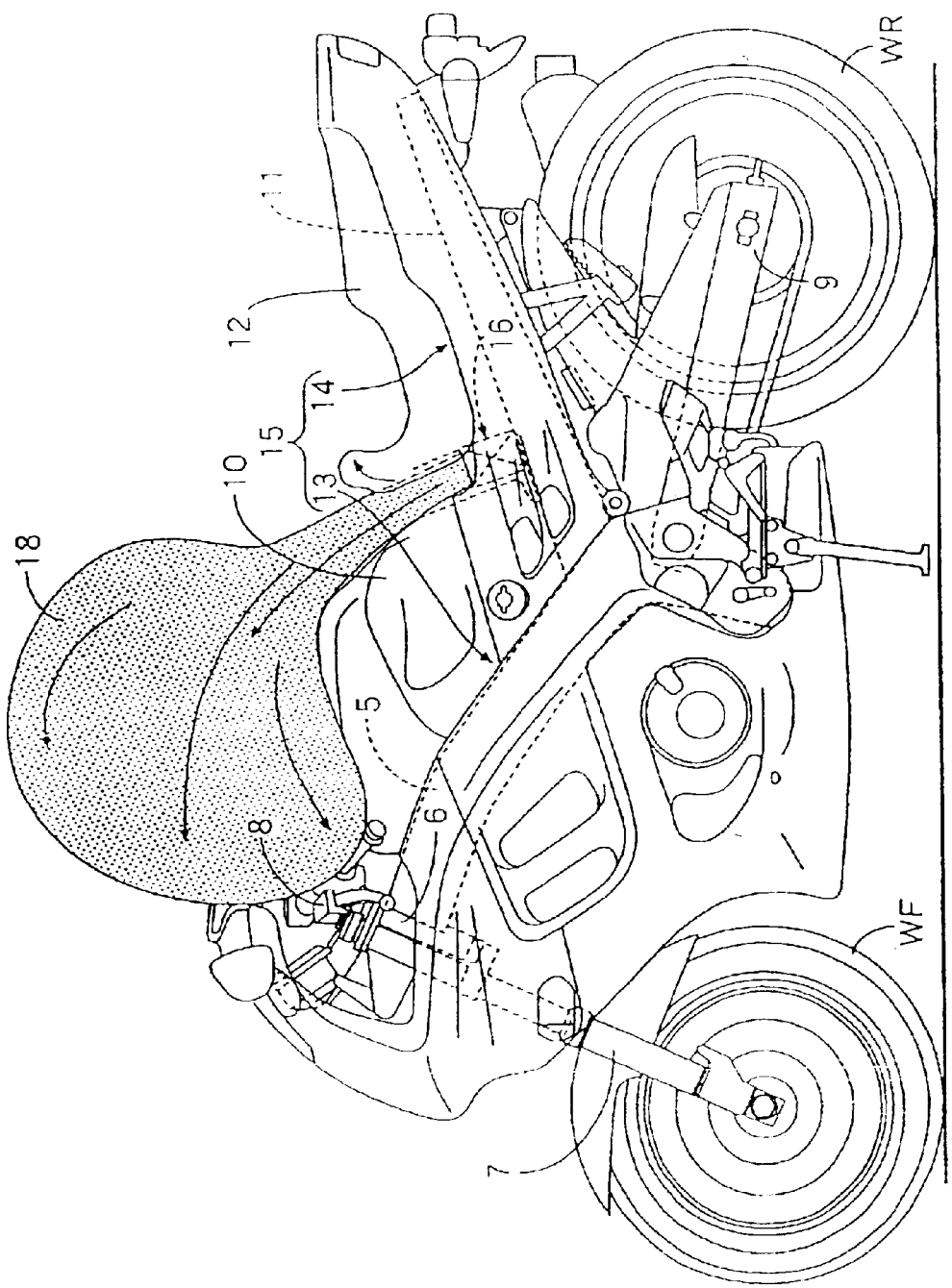
FIG. 3 is a side view corresponding to FIG. 1 showing a state in which the airbag is inflated and deployed.
Figure 4:
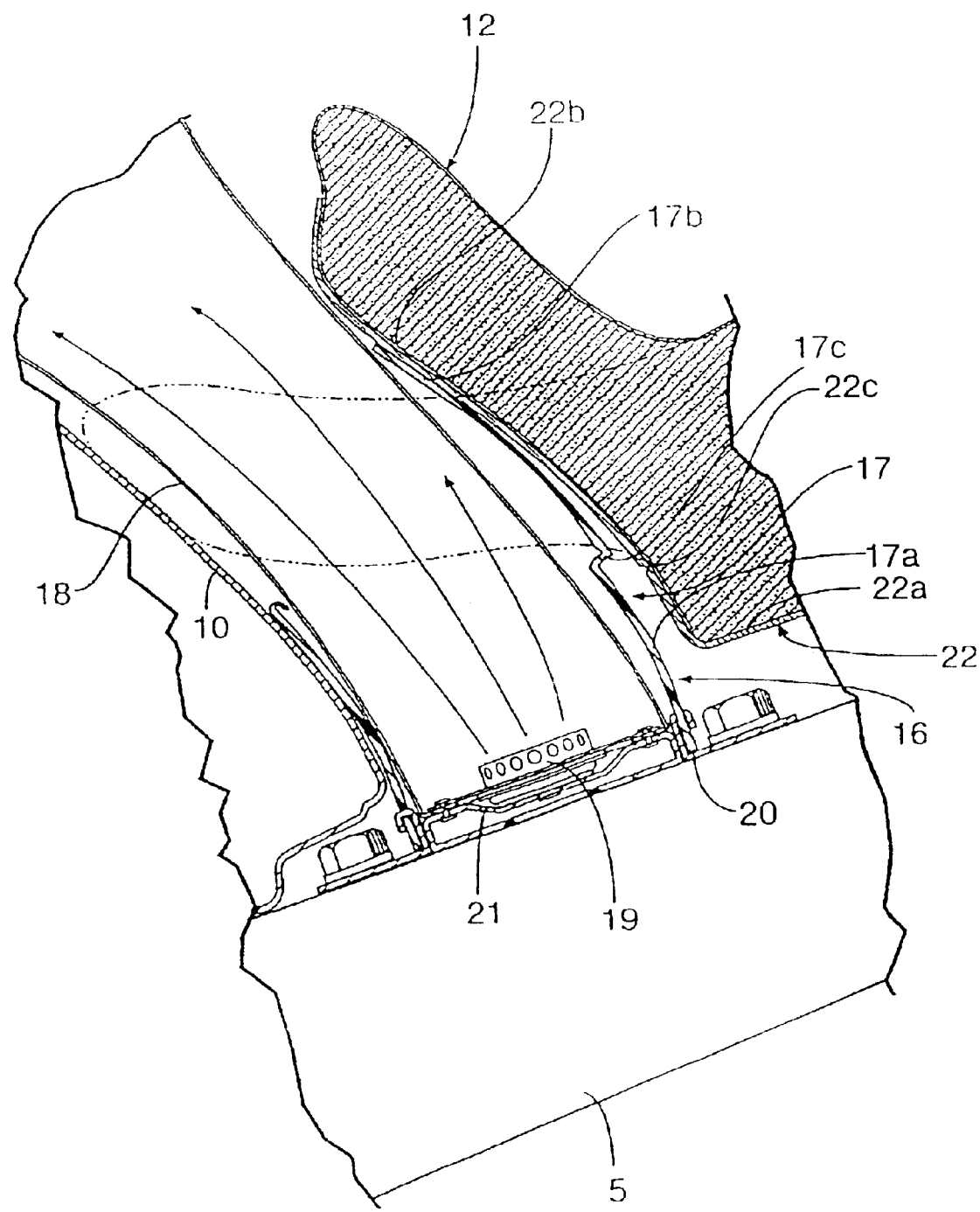
FIG. 4 is a vertical cross-sectional view corresponding to FIG. 2 showing a state in which the airbag is inflated and deployed.

When the impact detection sensor detects an impact larger than a predetermined value upon collision or the like, the inflator 19 is actuated and high-pressure gas is supplied into the airbag 18. The airbag 18 instantaneously expands upwardly while opening the lid portion 17b by breaking the weakened portion 17d of the airbag housing 17 as shown in FIG. 3 and FIG. 4.

In this case, since the front portion of the seat 12 covering the airbag module 16 from above may be opened with the rear side raised upwardly, the airbag 18 is inflated and deployed while pushing the front portion of the seat 12 with the rear side raised upwardly. Thus, the rider sitting on the seat 12 may be restrained from the front to alleviate the impact.

Although an embodiment of the present invention has been described thus far, the present invention is not limited to the above-described embodiment and various modifications in design may be made without departing the scope of the invention stated in claims.

As described thus far, according to the present invention, in a normal state in which an impact is not exerted on the motorcycle, the airbag module is covered by the front portion of the seat from above. Thus, water, mud, and the like may be prevented from breaking into the airbag module without requiring modification of the configuration of the appearance constituting parts. In addition, when an impact is exerted on the motorcycle, the airbag may be inflated and deployed while pushing the front portion of the seat upwardly, and thus the rider on the seat may be restrained from the front to alleviate the impact.

According to the present invention, the front portion of the seat may be opened with the rear side raised upwardly in a simple structure.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An airbag apparatus for a motorcycle to be mounted on a vehicle body frame of the motorcycle comprising:

an airbag module having an airbag that is capable of being inflated and deployed for restraining a rider sitting on a seat disposed behind a fuel tank; and a front portion of the seat is provided for covering the airbag module to be mounted behind the fuel tank on the vehicle body frame and extends to a position adjacent to a rear portion of the fuel tank, said front portion being constructed to be capable of being opened with the rear side raised upwardly in response to inflation and deployment of the aforementioned airbag.

2. The airbag apparatus for a motorcycle according to claim 1, wherein a seat bottom plate constituting the bottom of the seat comprises a main bottom plate portion that rotatably supports a major part of the seat and a front bottom plate portion for supporting a front portion of the seat, and the front bottom plate portion is connected to the front portion of the main bottom plate portion with a hinge in such a manner that the front bottom plate portion rotates so as to move the rear portion upwardly in response to inflation and deployment of the aforementioned airbag.

3. The airbag apparatus for a motorcycle according to claim 1, and further including an airbag housing for positioning said airbag in a stored condition in a folded state.

4. The airbag apparatus for a motorcycle according to claim 3, and further including an inflator being positioned adjacent to said airbag in the airbag housing, said inflator selectively supplying high pressure gas into said airbag when an impact larger than a predetermined value is detected.

5. The airbag apparatus for a motorcycle according to claim 4, and further including an impact detection sensor for detecting the impact.

6. The airbag apparatus for a motorcycle according to claim 5, wherein the impact detection sensor is an acceleration sensor.

7. The airbag apparatus for a motorcycle according to claim 3, wherein said airbag housing includes a lid portion for providing a closure for an upper opening in the airbag housing.

8. The airbag apparatus for a motorcycle according to claim 7, wherein said lid portion is constructed of synthetic material into a cap shape.

9. The airbag apparatus for a motorcycle according to claim 3, wherein said airbag housing includes a lower opening adapted to be attached to the vehicle body frame of the motorcycle.

10. The airbag apparatus for a motorcycle according to claim 7, wherein said airbag housing includes a storage portion and said lid portion is hinged to an upper portion of said storage portion.

11. An airbag apparatus adapted for use on a motorcycle comprising: a seat adapted to be mounted on a motorcycle;
   an airbag module having an airbag that is capable of being inflated and deployed for restraining a rider sitting on the seat; and
   a front portion of the seat is provided for covering the airbag module, said front portion being constructed to be capable of being opened with a rear side raised upwardly in response to inflation and deployment of the aforementioned airbag.

12. The airbag apparatus adapted for use on a motorcycle according to claim 11, wherein a seat bottom plate constituting the bottom of the seat comprises a main bottom plate portion that rotatably supports a major part of the seat and a front bottom plate portion for supporting a front portion of the seat, and the front bottom plate portion is connected to the front portion of the main bottom plate portion with a hinge in such a manner that the front bottom plate portion rotates so as to move the rear portion upwardly in response to inflation and deployment of the aforementioned airbag.

13. The airbag apparatus adapted for use on a motorcycle according to claim 11, and further including an airbag housing for positioning said airbag in a stored condition in a folded state.

14. The airbag apparatus adapted for use on a motorcycle according to claim 13, and further including an inflator being positioned adjacent to said airbag in the airbag housing, said inflator selectively supplying high pressure gas into said airbag when an impact larger than a predetermined value is detected.

15. The airbag apparatus adapted for use on a motorcycle according to claim 14, and further including an impact detection sensor for detecting the impact.

16. The airbag apparatus adapted for use on a motorcycle according to claim 15, wherein the impact detection sensor is an acceleration sensor.

17. The airbag apparatus adapted for use on a motorcycle according to claim 13, wherein said airbag housing includes a lid portion for providing a closure for an upper opening in the airbag housing.

18. The airbag apparatus adapted for use on a motorcycle according to claim 17, wherein said lid portion is constructed of synthetic material into a cap shape.

19. The airbag apparatus adapted for use on a motorcycle according to claim 13, wherein said airbag housing includes a lower opening adapted to be attached to a vehicle body frame of a motorcycle.

20. The airbag apparatus adapted for use on a motorcycle according to claim 17, wherein said airbag housing includes a storage portion and said lid portion is hinged to an upper portion of said storage portion.

* * * * *

UNITED STATES PATENT AND TRADEMARK OFFICE
CERTIFICATE OF CORRECTION

PATENT NO. : 6,848,709 B2  Page 1 of 1
APPLICATION NO. : 10/369751
DATED : February 1, 2005
INVENTOR(S) : Toshiya Nagatsuyu It is certified that error appears in the above-identified patent and that said Letters Patent is hereby corrected as shown below:

ON THE TITLE PAGE:

"(73) Assignee: Da Giken Kogyo Kabushiki Kaisha, Tokyo, Japan"

should read

--(73) Assignee: Honda Giken Kogyo Kabushiki Kaisha, Tokyo, Japan--.

Signed and Sealed this

Sixteenth Day of November, 2010

David J. Kappos
*Director of the United States Patent and Trademark Office*